United States Patent [19]

Tajiri

[11] Patent Number: 4,677,272

[45] Date of Patent: Jun. 30, 1987

[54] SEAM WELDING MACHINE

[75] Inventor: Hiromi Tajiri, Hyogo, Japan

[73] Assignee: Mitsubishi Denki Kabushiki Kaisha, Tokyo, Japan

[21] Appl. No.: 764,146

[22] Filed: Aug. 9, 1985

[30] Foreign Application Priority Data

Aug. 10, 1984 [JP] Japan .................. 59-123324

[51] Int. Cl.$^4$ ..................... B23K 11/06; B23K 11/32
[52] U.S. Cl. ........................ 219/110; 219/64
[58] Field of Search ............ 219/61.2, 61.5, 64, 219/110

[56] References Cited

U.S. PATENT DOCUMENTS 3,584,178 6/1971 Huber et al. ............... 219/64
3,632,949 1/1972 Thorne ..................... 219/64
4,554,430 11/1985 Belamaric ................. 219/64

FOREIGN PATENT DOCUMENTS 58-25886 2/1983 Japan ..................... 219/64

Primary Examiner—Clifford C. Shaw
Attorney, Agent, or Firm—Sughrue, Mion, Zinn, Macpeak, and Seas

[57] ABSTRACT

A seam welding machine capable of producing a uniform welding bead quality along the seam of cylindrical articles to be welded such as cans and the like. Commercial AC power is full-wave rectified and then passed through an inverter to produce a relatively high-frequency AC output current. The AC output current is applied through a center-tapped secondary transformer to a rectifier circuit, and thence through a smoothing circuit composed of a reactor and a capacitor to a pair of rotary electrodes. A detector senses when end portions of article to be welded are near the electrodes, and controls the AC power source so as to reduce the welding current at the times when the end portions of the articles to be welded are passing the rotary electrodes.

2 Claims, 8 Drawing Figures

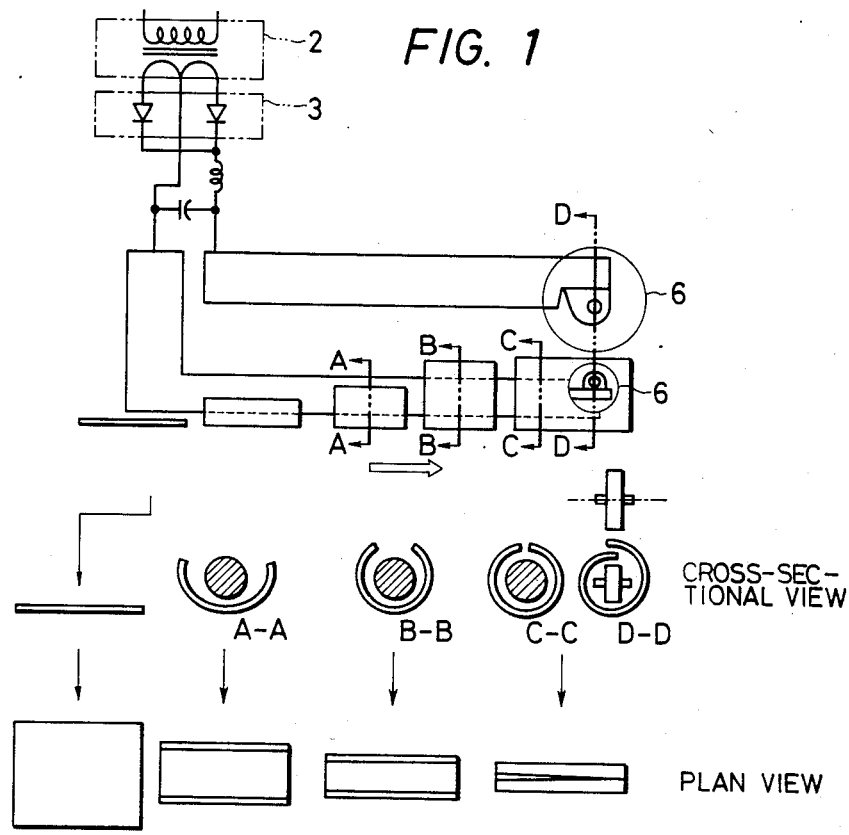

SEAM WELDING MACHINE

BACKGROUND OF THE INVENTION

The present invention relates to a seam welding machine for continuously welding seams at overlapping edges of articles to be welded while the seams pass between upper and lower rotary electrodes effecting welding by Joule heating.

In manufacturing juice or beer cans and the like, thin sheets are bent into cylindrical forms, and the overlapping portions of these articles are overlapped in the longitudinal direction. The overlapping portions are then welded using Joule heating. The articles are conveyed as shown in FIG. 4, that is, end-to-end in a direction A indicated by an arrow.

Generally, direct current is used to weld the seams of the articles 7 while they are being continuously conveyed in their axial direction. In the conventional direct-current welding apparatus, DC current is produced by single- or three-phase, full-wave rectification or six-phase, half-wave rectification of a commercial power source. The resulting DC current is applied directly between the upper and lower rotary electrodes. However, it is unavoidable that the welding current has peaks and troughs occurring at times determined by the frequency of the commercial power source, with the relative magnitudes of the peak and troughs being affected by the time constant (L/R) of the secondary circuit of the welding machine. Accordingly, it has been impossible to change the welding current waveform instantaneously. Moreover, if a welding current peak occurs as the end portions of an article being welded are passing the welding electrodes, overwelding tends to occur in those areas, thereby yielding a generally poor welding quality.

SUMMARY OF THE INVENTION

It is a primary object of the invention to overcome the drawbacks mentioned above.

More particularly, it is an object of the present invention to provide a seam welding machine in which the welding current is substantially constant, except at times when the end portions of the articles being welded are passing the electrodes of the machine, thereby to prevent overwelding at the end portions of the articles.

In accordance with the above and other objects, the invention provides a seam welding machine in which the welding current is furnished from a high-frequency power source via a transformer having a center-tapped secondary winding. A detector is provided to sense the passing of the end portions of articles being welded at the electrodes of the machine, and a gating circuit reduces the magnitude of the welding current as the end portions of the articles pass the welding electrodes.

BRIEF DESCRIPTION OF THE DRAWINGS

FIG. 1A is a schematic diagram illustrating a sequence of forming a cylindrical article;

FIGS. 1B and 1C are cross-sectional view and plan view of a sheet to be formed in cylindrical shape;

FIG. 2 is a circuit diagram illustrating a preferred embodiment of a seam welding machine of the present invention;

DESCRIPTION OF THE PREFERRED EMBODIMENTS

Figure 3:
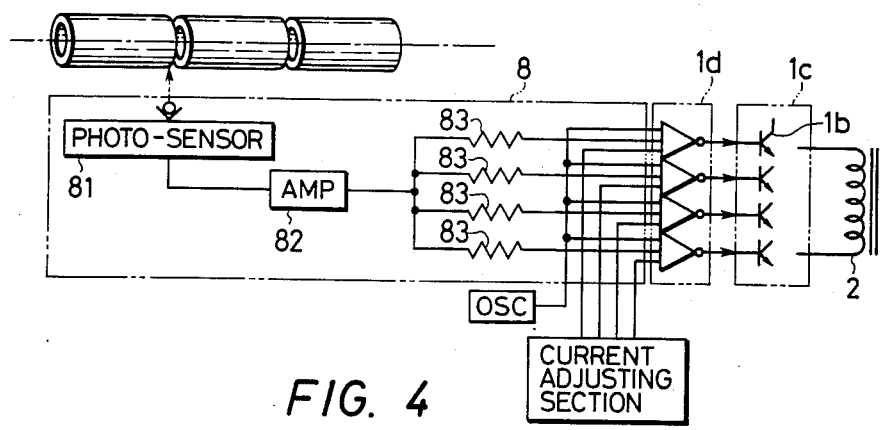
FIG. 3 is a detailed circuit diagram of detector 8 and gate circuit 1d shown in FIG. 2.
Figure 4:
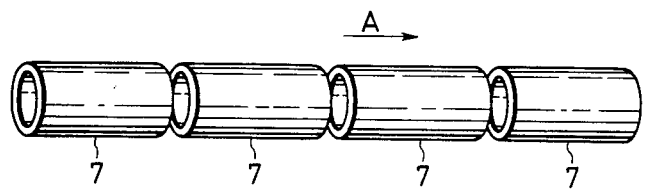
FIG. 4 is a side view of a series of articles to be welded.

FIG. 1A is a schematic diagram illustrating a sequence of forming an article of a cylindrical shape from a single sheet. The sheet is bent to a cylindrical shape by encircling with a lower arm having a circular cross-section. The sheet is conveyed in a direction indicated by an arrow towards the rotary electrodes.

FIG. 2 is a schematic diagram of a seam welding machine constructed in accordance with the present invention. In FIG. 2, a high-frequency power source 1 is employed. The power source 1 includes a diode bridge circuit 1a for converting commercial power to rectified DC current. In this case, it is assumed that a three-phase commercial source is employed. The diodes of the bridge 1a are connected in a full-wave configuration. The power source 1 further includes an inverter 1c for converting the rectified commercial DC power to relatively high-frequency AC, for instance, at about 600 Hz. The inverter 1c is composed of four transistors 1b, the bases of which are driven by a gating circuit 1d. The output of the inverter 1c is applied to the primary of a transformer 2, the secondary of which is center tapped. Diodes 3 are provided to full-wave rectify the voltage produced at the secondary of the transformer 3. A reactor 4 is connected in series with the positive terminal output of the rectifier circuit 3, and a smoothing capacitor 5 is coupled between the rotary electrodes 6, the inner one of which is connected to the center tap of the transformer 3. A detector 8 is provided for detecting the presence of an end portion of one of the article 7 near the electrodes 6.

FIG. 3 is a detailed circuit diagram of the detector 8, gate circuit 1d shown in FIG. 2. In FIG. 3, the detector 8 includes a photo-sensor 81, amplifier 82 and four resistors 83. The gate circuit 1d includes four inverters provided in association with the four resistors 83. The inverter of the gate circuit 1d is formed with a combination of AND gates, OR gates, etc. so that it gates either the output of the photo-sensor 81 or a basic current determined by an oscillator and a current adjusting section. The oscillator produces pulses having a predetermined frequency and the output thereof is applied to one input of each of the inverters in the gates circuit 1d. The current adjusting section is made up of a variable resistor and the output thereof is connected to another input of each of the inverters in the gate circuit 1d to adjust the level of pulses produced from the oscillator.

Figure 5:
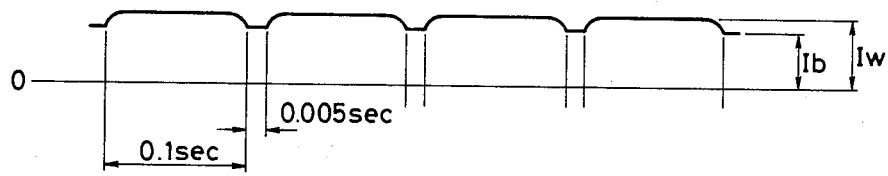
FIG. 5 shows the waveform of the welding current employed in the seam welding machine of the invention.
Figure 6:
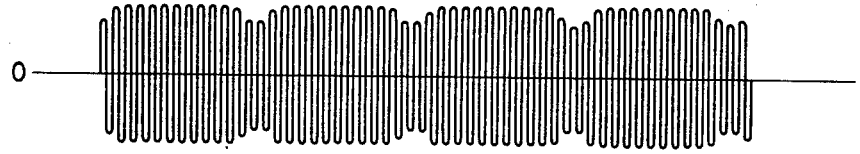
FIG. 6 shows the waveform of a current in a high-frequency power supply employed in the seam welding machine of the invention.

In operation, the articles 7 are conveyed in sequence past the rotary electrodes 6 at a speed of, for instance, 60 m/min. When the detector 8 senses the presence of an end portion of one of the articles 7, it instructs the gate circuit 1d to reduce the amplitude of the output of the power source 1. This output is shown in FIG. 6. On the other hand, when the detector 8 does not sense the presence of the end portion of the article 7, an output is produced from the gate circuit 1d in accordance with the pulses produced from the oscillator and regulated by the current adjusting section. The rectified output produced by the rectifier circuit 3 is shown in FIG. 5. As indicated in FIG. 5, due to the presence of the reactor 4 and the capacitor 5, there are substantially no peaks or troughs in the welding current, the steady-state welding current $I_w$ being very constant, except when the end portions of the article 7 are passing near the electrodes 6, in which case the welding current is reduced to a value $I_b$, suitable for preventing overwelding at the end portions of the articles 7. Typically, the current $I_w$ flows for a period of about 0.1 sec, while the duration of the current $I_b$ is typically 0.005 sec. With the frequency of the output of the power source 1 being about 600 Hz, the switch between values $I_w$ and $I_b$ can be made quickly and smoothly.

With the present invention as described above, overwelding at the end portions of the articles being welded is prevented. Thus, a smooth and uniform welding bead is attained, and very high quality welding conditions are maintained.

I claim:

1. A seam welding machine comprising:
   a diode bridge having an input coupled to a three-phase AC source;
   an AC inverter having input coupled to a rectified output of said diode bridge;
   a transformer having a primary coupled to an output of said inverter and a center-tapped secondary;
   a full-wave diode rectifier coupled to said secondary;
   a reactor and a capacitor coupled to an output of said full-wave diode rectifier for smoothing a DC waveform at said output of said full-wave diode rectifier, the resulting smoothed DC waveform being applied between a pair of rotary electrodes for welding seams along cylindrical articles;
   a photo-sensor positioned along a path of said articles for detecting end portions thereof;
   an amplifier having an input coupled to an output of said photo-sensor;
   a plurality of resistors having first terminals coupled to an output of said amplifier;
   an oscillator for producing an oscillation signal having a frequency higher than that of said three-phase source;
   a current adjusting circuit;
   a plurality of gating means having inputs coupled to second terminals of respective ones of said resistors and other inputs coupled to outputs of said current adjusting circuit and said oscillator, said gating means passing said oscillation signal produced by said oscillator at a first level set by said current adjusting circuit when said output of said photo-sensor is not in a state indicative of an end portion of said articles and at a second level, lower than said first level, when said output of said photo-sensor is at a level indicative of end portions of said articles, said outputs of said gating means being applied to said inverter for controlling by pulse width modulation an amplitude of said output of said inverter in accordance with said first and second levels.

2. The seam welding machine of claim 1, wherein said frequency of said oscillation signal is approximately 600 Hz.

* * * * *